March 24, 1925.

G. H. GIBSON 1,530,598

METHOD AND APPARATUS FOR DEAERATING WATER

Original Filed April 13, 1921    3 Sheets-Sheet 1

Fig.1,

INVENTOR
George H. Gibson
BY
John E. Hubbell
ATTORNEY

March 24, 1925.　　　　　　　　　　　　　　　　　　1,530,598
G. H. GIBSON
METHOD AND APPARATUS FOR DEAERATING WATER
Original Filed April 13, 1921　　3 Sheets-Sheet 3

INVENTOR
George H. Gibson
BY
John E. Hubbell
ATTORNEY

Patented Mar. 24, 1925.

UNITED STATES PATENT OFFICE.

GEORGE HERBERT GIBSON, OF MONTCLAIR, NEW JERSEY, ASSIGNOR TO COCHRANE CORPORATION, OF PHILADELPHIA, PENNSYLVANIA, A CORPORATION OF PENNSYLVANIA.

METHOD AND APPARATUS FOR DEAERATING WATER.

Application filed April 13, 1921, Serial No. 461,074. Renewed July 15, 1924.

*To all whom it may concern:*

Be it known that I, GEORGE H. GIBSON, citizen of the United States, and resident of Montclair, in the county of Essex and State of New Jersey, have invented certain new and useful Improvements in Methods and Apparatus for Deaerating Water, of which the following is a specification.

The general object of the present invention is to provide an improved method of and apparatus for freeing water from air dissolved therein.

In carrying out the present invention I heat water in a heater, preferably of the open feed water heater type, to a temperature in the neighborhood of 212° F. under conditions facilitating the elimination from the water of a large portion of the air contained in it, and then pass the water into an expansion chamber in which a partial vacuum is maintained and into which the water is preferably sprayed or otherwise caused to flow through the vapor space thereof in film-like or broken streams. Because of the reduction in pressure to which the water is subjected, a portion of the water entering the expansion chamber is converted into steam, the necessary latent heat of evaporation being furnished by the unvaporized portion of the water which is thereby cooled approximately to the temperature of saturated steam at the minus pressure maintained in the expansion chamber. Under these conditions all but a very small amount of any air contained in the water entering the expansion chamber is liberated from the water and mingles with the steam generated in the expansion chamber. The steam thus generated, is then condensed in a condenser of the jet as distinguished from the surface condenser type by direct contact with the raw water to be deaerated which with its condensate addition is then passed to the heater.

Advantageously in some cases, the condenser is of such type that the water, including the raw water supplied thereto and the water of condensation formed therein will entrain and carry out of the condensing chamber any air entering the condensing chamber with the steam from the expansion chamber. In this case the air entrained in the water leaving the condensing chamber is passed with the latter into the heater. The further heating which the water receives in the heating chamber may advantageously be obtained by passing exhaust steam into the heating chamber. When as may advantageously be the case under some conditions, the condenser employed is of the jet condenser type with a barometric column discharge, the condenser may in some cases be located above the heating chamber and discharge by gravity in the latter, while in other cases, in which the water outlet from the condenser cannot well be located at a level above the level inlet of the heater, a pump is employed for passing the water from the condenser outlet to the heating chamber.

Where a condenser with a barometric column discharge is employed the temperature of the deaerated water leaving the expansion chamber must be appreciably higher than the temperature of the water leaving the condenser to effect the desired air entrainment. In consequence where a relatively low temperature for the deaerated water is desirable I employ a different type of jet condenser and provide a steam jet or other suitable form of exhauster or air pump for withdrawing air from the condensing chamber.

By proceeding in accordance with the present invention I am enabled to free water from air and other gases with relatively simple and inexpensive apparatus and to deliver the deaerated water without waste of heat at a temperature appreciably below that maintained in the heating chamber. This is an advantage where the water is boiler feed water which is to be passed through an economizer before delivery to the boiler. The elimination of air in such cases is especially desirable where the economizer tubes are of steel or wrought iron because of the corrosive effect of air dissolved in the water and because the temperature of the water supplied to the economizer is sufficiently low to permit of an effective use of the waste heat available in the economizer.

The invention is also well adapted for use in preparing water for use in ice manufacture and in general wherever heat purified, air free water at a moderate temperature is required. In cases in which the presence of the very small amount of air contained in the water leaving the expansion chamber is objectionable, this air may be eliminated in known ways as by passing the water through a filter of iron filings or the like, or by subjecting the water to an electrolytic treatment.

The various features of novelty which characterize my invention are pointed out with particularity in the claims annexed to and forming a part of this specification. For a better understanding of the invention, however, and the specific objects and advantages attained with its use reference should be had to the accompanying drawings and descriptive matter in which I have illustrated and described preferred embodiments of my invention.

Figure 1:
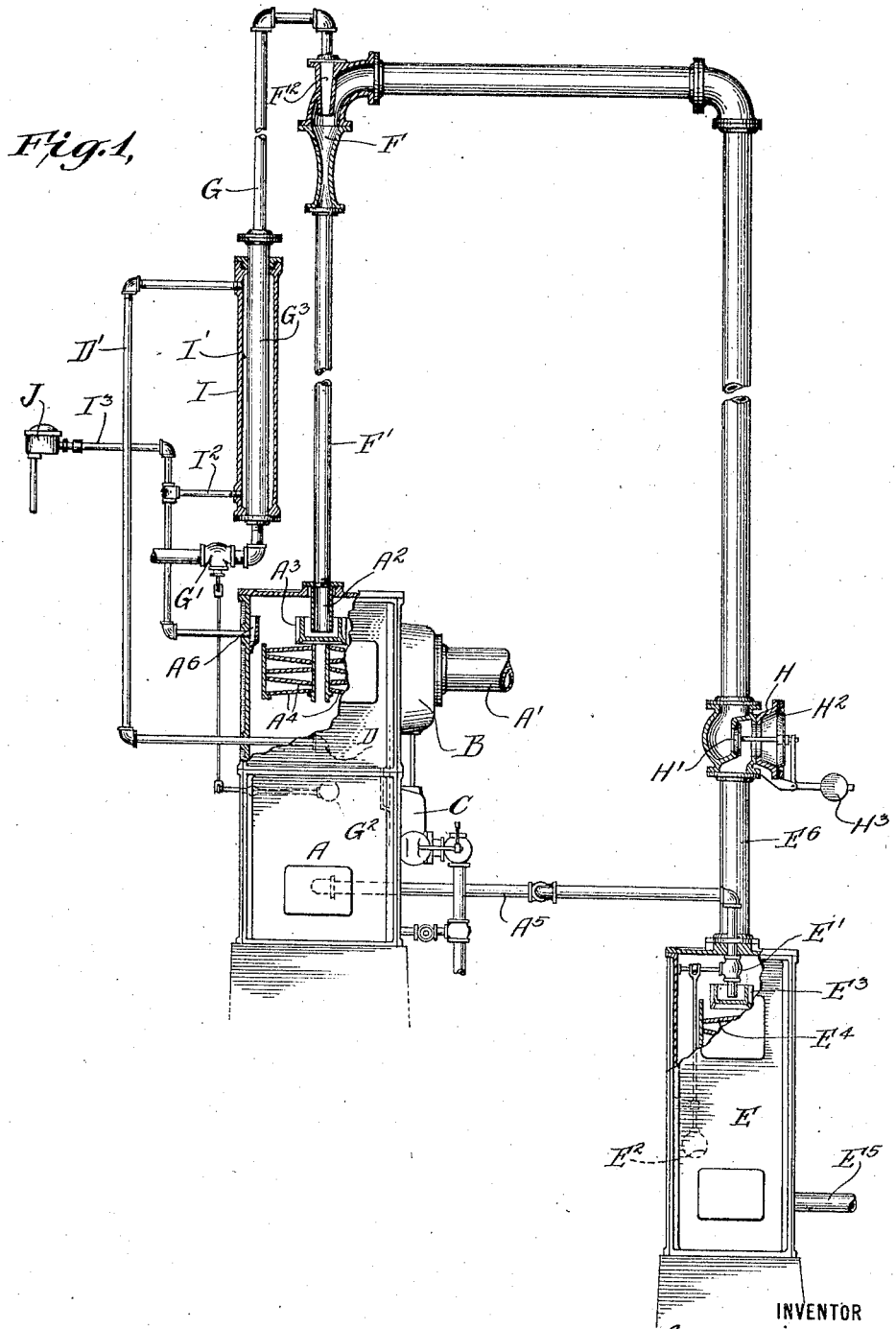
Fig. 1 is a diagrammatic elevation of apparatus comprising a condenser provided with a barometric column discharge opening directly into an open feed water heater.

In the drawings, and referring first to the construction shown in Fig. 1, A represents a water heater of a well known feed water heater type having a steam inlet A', a water inlet A² discharging into a spreader trough A³ beneath which are located the usual baffle plates A⁴ over which the water flows in film-like and broken streams. A⁵ represents the hot water discharge pipe from the heater A, and D represents an outlet for air opening to the heater D below the trays A⁴ and above the water level normally maintained in the heater. B represents the usual separator interposed between the heater proper, and the steam supply pipe A', and C is the usual trap for discharging oil and other liquid separated from the steam in the separator B.

The hot water discharge pipe A⁵ leads to the closed expansion chamber E where it discharges into a spreader trough E³ arranged above a set of baffles E⁴. E⁵ represents the water outlet from the expansion chamber E. The height of water level in the chamber E is controlled by a float E² connected to a valve E' at the discharge end of the pipe A⁵. To avoid air leakage and stuffing box troubles, the valve E' and its connections to the float E² are advantageously all located within the chamber E. The chamber E is provided with an air and vapor outlet connection E⁶ which runs to the steam and vapor inlet of a jet condenser F. The raw water to be deaerated is supplied to the cold water jet nozzle F² of the condenser F by a conduit G, the flow through which is controlled by a valve G' and float G² in response to the height of water level in the heater A.

The vacuum maintained in the chamber E is governed by an automatic vacuum regulating valve H in the vapor outlet E⁶. As shown the valve H comprises a valve member H' proper which is urged towards its closed position by the pressure of the atmosphere against the outer side of a flexible diaphragm H² to which the stem of the valve member H' is connected. The valve H' is given a tendency to open by the pressure existing in the chamber E acting against the inner side of the diaphragm H² and by the gravity effect of the adjustable weight H³ carried by one arm of a bell crank lever which has its other arm connected to the diaphragm H². The air and vapor escaping from the heater A through the outlet D passes through a pipe D' to a cooling and condensing space I' between a tubular element I and an enlarged portion G³ of the raw water supply pipe G which the element I surrounds. Water of condensation formed in the space I' is returned to the heater A through the pipe connection I². The pocket A⁶ into which the discharge end of the pipe I² opens provides a water seal for the discharge end of the pipe I². Air passing out of the space I' through the pipe I² is discharged to the atmosphere through a branch pipe I³ which may be provided as shown with a suitable trap J of known type for discharging air but not steam.

In the contemplated mode of operation of the apparatus disclosed the water passing into the heater A is heated therein to a temperature in the neighborhood of 212°. By heating the water to this temperature as it passes in film-like and broken streams through the steam and air space of the heater, the major portion of the air content of the water is liberated in the heater, from which it escapes through the air outlet D. This air is eventually discharged to the atmosphere through the pipe I³ and trap J. The water passing through the connection A⁵ from the heater to the expansion chamber is cooled in the latter to a substantial extent. The temperature to which the water is cooled in the chamber E depends of course upon the vacuum or minus pressure maintained therein. In practice I contemplate the normal maintenance of a temperature of 150 or 160° in the chamber E in ordinary cases when the water treated is boiler feed water which is passed from the chamber outlet E⁵ to an economizer. The reduction in water temperature and pressure occurring in the chamber E causes the conversion of a portion of the water into steam and this steam generation atomizes the unvaporized water, so to speak, so that all but a very small portion of the air contained in the water entering the expansion chamber will be liberated therein, and will pass out of the expansion chamber E through the air and vapor outlet $E^6$. This steam is condensed in the condenser F by the raw water and the mixture of raw water and condensate will entrain and carry with it into the heater the air entering the condenser with the steam. The vacuum regulator H prevents the maintenance at any time of an excessive vacuum in the heater E, and the provision of the barometric column discharge F' for the condenser F gives a certain flexibility of operation and makes unnecessary especially sensitive provisions for controlling the supply of water to the apparatus.

Figure 2:
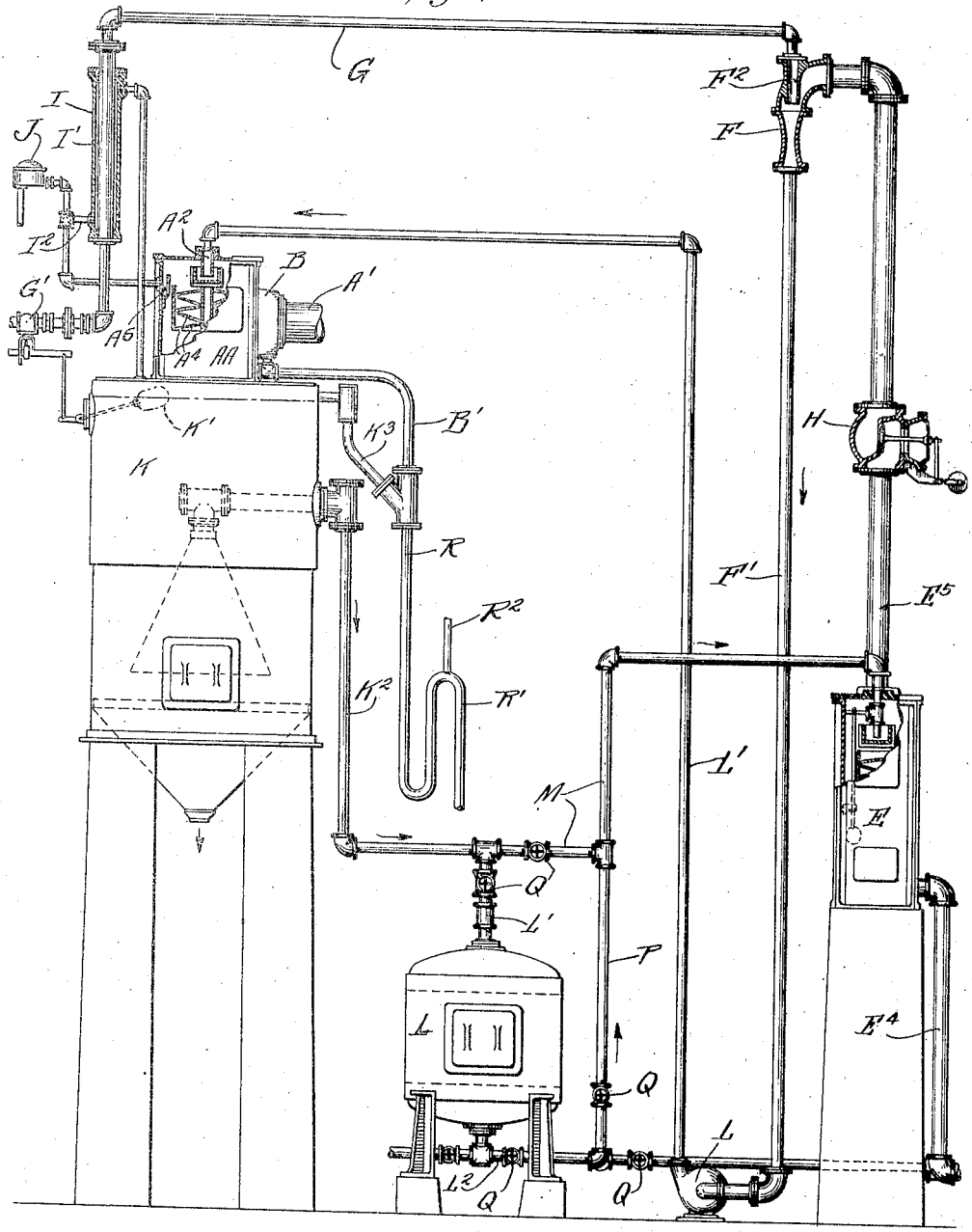
Fig. 2 is a diagrammatic elevation of apparatus in which the water is heated in a water softening device to which the water discharged from the condenser is pumped.

The apparatus shown in Fig. 2 differs primarily from that shown in Fig. 1 in that the heater AA, replacing the heater A of Fig. 1, is mounted above and opens at its lower end directly into the decanting tank or settling chamber K of a well-known form of the so-called hot process water purifying apparatus. The valve G' regulating the flow of water through the raw water supply pipe G is controlled in this case by a float in the decanting chamber K. With this type of apparatus it is ordinarily not convenient to locate the condenser K at an elevation high enough to permit of a barometric column discharge directly into the heater AA, and in consequence a pump is provided for passing the water and entrained air discharged through the column F' to the water inlet $A^2$ of the heater AA. R represents a waste connection provided with a looped seal portion R' having a vent to the atmosphere at $R^2$, which receives the overflow from the chamber K through the connection $K^3$, and receives the drip from the separator B through the drip pipe B'. The water passing out of the chamber K to the water outlet $K^2$ of the latter may pass directly to the water inlet of the expansion chamber E through the pipe M, or by suitable manipulation of valves Q in the pipes M, L' $L^2$ and P may be caused to pass through a sand or other filter L before passing from the pipe $K^2$ to the expansion chamber E.

Figure 3:
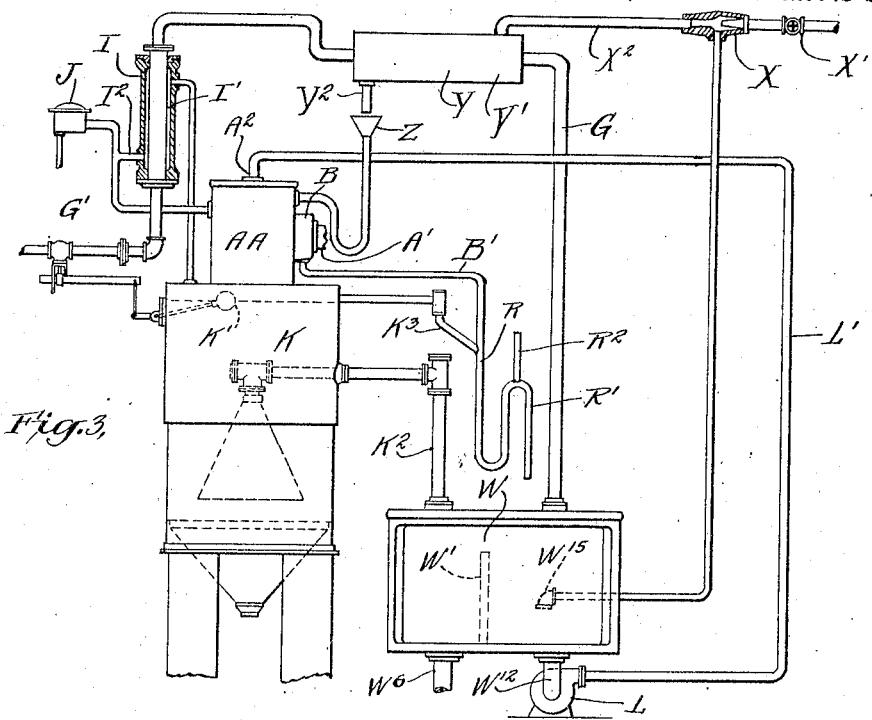
Fig. 3 is a diagrammatic elevation of a modified form of apparatus.

Instead of employing a condenser with a barometric column discharge such as is shown in Figs. 1 and 2, I may employ other forms of jet condensers and in Fig. 3 I have illustrated a modification of the apparatus shown in Fig. 2 in which a device W which I call an open heat exchanger replaces the condenser F and the expansion chamber E of Fig. 2. The heat exchanger W comprises a chamber having its lower portion divided into two water receiving compartments $W^{20}$ and $W^{30}$ by a partition W' which terminates below the top of the chamber so that the upper portions of compartment $W^{20}$ and $W^{30}$ are in communication with one another over the top of partition W'. The water leaving the chamber K through the discharge connection $K^2$ is discharged in film-like and broken streams into the compartment $W^{20}$. As shown this water is discharged through a spray head $W^2$ onto baffles $W^5$. The flow of water to the spray head $W^2$ is controlled by a valve $W^3$ and float $W^4$ so as to maintain an approximately constant water level in the compartment $W^{20}$ which is below the baffles $W^5$ and well below the top of the partition W'. The water leaves the compartment $W^{20}$ through the outlet $W^6$ which may run directly to the boiler economizer, ice making apparatus or other apparatus in which the water is to be used, or may pass first to filter mechanism not shown.

Figure 4:
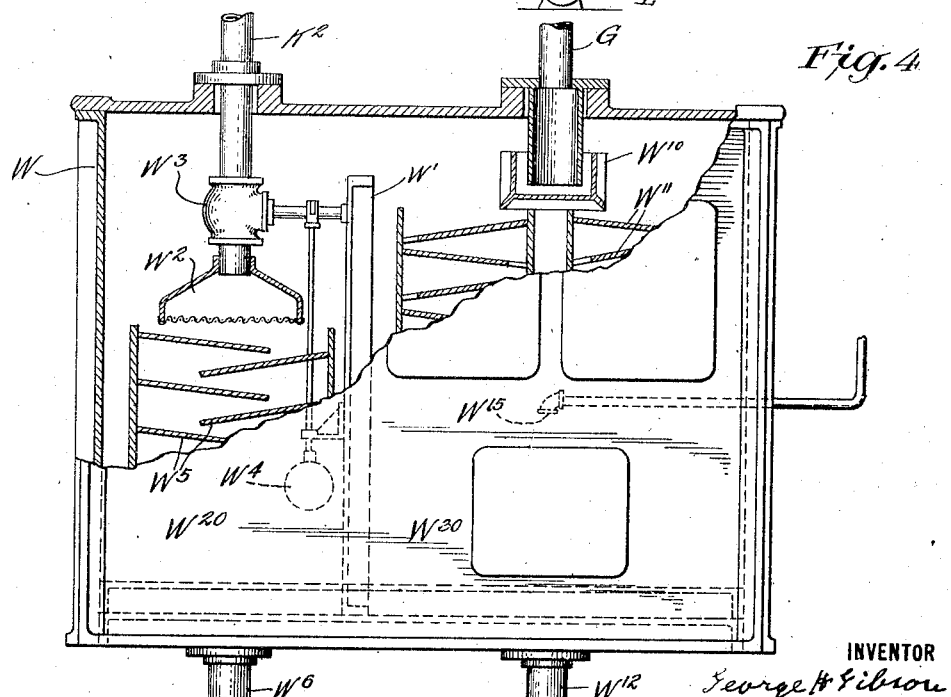
Fig. 4 is an elevation with parts broken away and in section of a portion of the apparatus employed in Fig. 3.

The raw water supply pipe G in the apparatus of Figs. 3 and 4 discharges into the upper portion of the compartment $W^{30}$ in film-like and broken streams. As shown the film-like and broken streamflow is obtained by means of a distributing trough $W^{10}$ and trays or baffles $W^{11}$. Water is discharged from the compartment $W^{30}$ through the outlet connection $W^{12}$ running to the inlet of pump L by which this water is passed through the discharge connection L' to the water inlet $A^2$ of the heater AA. Air is withdrawn from the air and vapor space within the device W by an air outlet $W^{15}$ which, as shown, opens into the compartment $W^{30}$ below the trays $W^{11}$. The air outlet is connected to a steam jet ejector X supplied with live steam through the connection X'. The discharge from the ejector X may be passed directly to the heater AA but preferably, as shown, the discharge pipe $X^2$ from the ejector X leads to a condenser space Y' formed between a section of the raw water supply pipe G and a tubular element Y surrounding this section of the pipe G. Water of condensation formed in the space Y' drips into a return pipe Z formed with a depending loop portion providing a water seal and discharging into the heater AA, while the air issuing from the outlet $Y^2$ passes into the atmosphere.

In the operation of the apparatus of Figs. 3 and 4, the heat exchanger W acts like the expansion chamber E of Figs. 1 and 2 to convert a portion of the water entering the chamber through the pipe $K^2$ into vapor and to correspondingly reduce the temperature of the water collecting in the compartment $W^{20}$. The heat exchanger W also acts as a condenser in which the water supplied to it by the pipe G condenses the vapor into which a portion of the water supplied by the pipe $K^2$ is converted. The heat given up in the exchanger L by the water admitted thereto through the pipe $K^2$ and absorbed by the water admitted through the pipe G, is returned to the heater AA with the water withdrawn from the heat exchanger W through the outlet W¹² and pump L. The raw water in passing through the heat exchanger W will ordinarily give up a portion of its air content on account of the reduction in pressure and increase in temperature to which it is subjected in the heat exchanger. The air thus liberated is withdrawn by the ejector X.

The apparatus shown in Fig. 3 possesses one advantage over that shown in Figs. 1 and 2 which is an important one under some conditions of use in that the deaerated water may be discharged from the heat exchanger W through the outlet W⁶ at a substantially lower temperature than the water can be discharged from the expansion chamber E of Figs. 1 and 2. This arises from the fact that the water discharged from the condenser F must, for effective air entrainment be from 13 to 15° F. cooler than the vapor and air mixture entering the condenser from the expansion chamber. This means that the water leaving the expansion chamber E in Figs. 1 and 2 must be 13° to 15° hotter than the water leaving the condenser F, while with the apparatus shown in Figs. 3 and 4, the temperature of the water leaving the heat exchanger W through the outlet W⁶ need be no higher than that of the water leaving the heat exchanger through the outlet W¹².

By the term "air" as used herein, I mean to include not only atmospheric air and its constituents, but other gases liberated from the water by the addition thereto, as in the heater AA, of chemical purifying reagents, as well as by the temperature and pressure conditions to which the water is subjected. The invention is of especial utility in feed water which is to be passed through an economizer into a boiler since the removal of air and gases reduces the corrosive action of the water especially deleterious when the water is to be passed through economizers made of steel or wrought iron, and the water may be passed to the economizer at a temperature low enough for the effective utilization of the available waste heat in the economizer. The invention is also useful in preparing water for ice manufacture and for other purposes where deaerated, sterilized and purified water is desired or required at a temperature appreciably below 212° F.

In my co-pending application, Serial No. 461,075, filed at even date herewith, I have disclosed and specifically claimed a form or development of the invention disclosed and generically claimed herein in which the expansion of the water being deaerated is carried out in successive stages. In that application I also claim specifically the use of the heat exchanger in a combination of the general character shown in Figs. 3 and 4 of this application. This heat exchanger is capable of use in other relations than that illustrated herein and embodies features of novelty which are claimed in my application, Serial No. 523548, filed December 19, 1921, as a division of this application.

While in accordance with the provisions of the statutes I have illustrated and described the best forms of my invention now known to me, it will be apparent to those skilled in the art that changes may be made in the form of the apparatus disclosed without departing from the spirit of my invention as set forth in the appended claims, and that under some conditions, certain features of my invention may be used to advantage without the corresponding use of other features.

Having now described my invention, what I claim as new and desire to secure by Letters Patent, is:

1. The method of deaerating water which consists in heating water to a temperature approximating 212° F. in a heater having an air and vapor space in which a pressure approximately equal to that of the atmosphere is maintained, separately discharging from the heater the air liberated therein and the heated and partially air freed water and passing the latter into an expansion chamber in which a pressure appreciably below that of the atmosphere is maintained, condensing the vapor thereby generated by mixing it with the raw water to be deaerated, and passing the raw water and condensate mixed with it to said heater.

2. The method of deaerating water which consists in heating water to approximately 212° F. and causing it to flow in film-like or broken streams through an air liberating space in which a pressure approximately equal to that of the atmosphere is maintained, then passing the water into an expansion chamber removing liberated air and vapor generated from said chamber as required to maintain a pressure therein appreciably below that c the atmosphere, condensing said vapors ' y admixture with the raw water to be deae ated and then subjecting the raw water and its condensate addition to the heating and flow conditions through the air liberating space above mentioned.

3. The improved method of deaerating water which consists in heating water in a heater having an air and vapor space and an air vent, supplying steam to the heater to maintain a pressure in said space approximating that of the atmosphere, passing the water heated in said heater from the latter into a chamber in which a pressure appreciably below that of the atmosphere is maintained whereby a portion of the water is converted into vapor and the unvaporized residue is cooled and freed from air, condensing the vapor by admixture with the raw water to be treated, and passing the latter with the condensate addition to the heater.

4. The method of deaerating water which consists of heating water to a temperature in the neighborhood of 212° in a heater having an air and vapor space in which approximately atmospheric pressure is maintained, eliminating the air liberated from the water in the heater, passing the heated and partially air freed water from the heater into an expansion chamber, withdrawing air and vapor from said expansion chamber as required to maintain a pressure therein appreciably below that of the atmosphere, mixing the air thereby liberated and the vapor thereby generated with the raw water to be treated to thereby condense the vapor and entrain the air, and passing the resultant air and water mixture into said heater.

5. Apparatus for deaerating water comprising in combination means for heating water to a temperature of approximately 212° and for eliminating air thereby liberated from the water, an expansion chamber to which the heated water is passed, means for maintaining a pressure less than that of the atmosphere in said expansion chamber comprising provisions for condensing the vapor generated in said expansion chamber by admixture with the raw water to be deaerated, and means for passing the raw water and its condensate addition to the water heating means.

6. Apparatus for deaerating water comprising in combination a heater of the open feed water type provided with an air vent and provisions for supplying steam thereto to maintain approximately atmospheric pressure therein, an expansion chamber to which the water is passed from the heater, a jet condenser having water and vapor inlets and discharging into the heater, a raw water supply connection to the water inlet of said condenser and a vapor pipe connection from the vacuum chamber to the vapor inlet of said condenser.

7. Apparatus for deaerating water comprising in combination a heater of the open feed water type having an air vent and provisions for supplying steam to the heater to maintain a steam pressure therein approximating the pressure of the atmosphere, an expansion chamber to which the water is passed from the heater, a jet condenser with a barometric column discharge connected to the heater, a raw water supply connection to the water inlet of said condenser and a vapor pipe connection from the vacuum chamber to the vapor inlet of said condenser.

8. Apparatus for deaerating water comprising in combination a heater of the open feed water type having an air vent and provisions for supplying steam to the heater to maintain a steam pressure therein approximating the pressure of the atmosphere, an expansion chamber to which the water is passed from the heater, means for maintaining a pressure in the expansion chamber less than that of the atmosphere comprising provisions for mixing the vapor generated and air liberated in the expansion chamber with the raw water to be deaerated so as to condense the vapor and entrain the air, and means for passing the raw water with its condensate addition and entrained air to said heater.

9. Apparatus for deaerating water comprising in combination a heater of the open feed water type having an air vent and provisions for supplying steam to the heater to maintain a steam pressure therein approximating the pressure of the atmosphere, an expansion chamber into which water heated in the heater is passed, regulable means for maintaining a pressure less than that of the atmosphere in said expansion chamber comprising provisions for condensing the vapor generated in said expansion chamber by admixture with the raw water to be deaerated, and means for passing the raw water and its condensate addition to said heater.

10. Apparatus for deaerating water comprising in combination a heater of the open feed water type having an air vent and provisions for supplying steam to the heater to maintain a steam pressure therein approximating the pressure of the atmosphere, an expansion chamber into which water heated in the heater is passed, means for maintaining a pressure less than that of the atmosphere in said expansion chamber comprising provisions for condensing the vapor generated in said expansion chamber by admixture with the raw water to be deaerated, means for passing the raw water and its condensate addition to said heater, and a condenser of the surface condenser type having its water space traversed by the raw water and having its vapor space connected to said air vent and having an outlet for the escape of air and a return to the heater for the water of condensation formed therein.

11. Apparatus for deaerating water comprising in combination a heater of the open feed water type having an air vent and provisions for supplying steam to the heater to maintain a steam pressure therein approximating the pressure of the atmosphere, an expansion chamber, a valve mechanism responsive to the height of water level in said expansion chamber regulating the admission of water to the expansion chamber from the heater, means for maintaining a pressure in the expansion chamber less than that of the atmosphere including provisions for condensing the vapor generated in said expansion chamber by admixture with the raw water to be deaerated, and means for passing the raw water and its condensate addition to said chamber.

12. Apparatus for deaerating water comprising in combination a heater of the open feed water type having an air vent and provisions for supplying steam to the heater to maintain a steam pressure therein approximating the pressure of the atmosphere, an expansion chamber into which the water heated in the heater is passed, an air and vapor outlet from the expansion chamber, a condenser, a connection between said air and vapor outlet and said condenser including a valve mechanism automatically responsive to the difference between the pressure of the atmosphere and the minus pressure in the expansion chamber for restricting said connection when the pressure difference exceeds a predetermined amount.

13. Apparatus for deaerating water comprising in combination a heating chamber provided with a water inlet and separate air and water outlets and means for heating the water therein to a temperature of approximately 212°, an expansion chamber receiving the water discharged from the water outlet of the heater, means for maintaining a pressure less than that of the atmosphere in said expansion chamber comprising provisions for condensing the vapor generated by said expansion chamber by admixing with the raw water to be deaerated, and means for passing the raw water and its condensate addition to said heater.

14. Apparatus for deaerating water comprising in combination a heater of the open feed water type having an air vent and provisions for supplying steam to the heater to maintain a steam pressure therein approximating the pressure of the atmosphere, an expansion chamber into which water heated in the heater is passed, means for maintaining a pressure less than that of the atmosphere in said expansion chamber comprising provisions for condensing the vapor generated in said expansion chamber by admixture with the raw water to be deaerated, and means for passing the raw water and its condensate addition to said heater.

15. Apparatus for deaerating water comprising in combination a heater of the open feed water type having an air vent and provisions for supplying steam to the heater to maintain a steam pressure therein approximating the pressure of the atmosphere, means for withdrawing heated water from the heater and subjecting it to a pressure less than that of the atmosphere to thereby evaporate a portion of the water and liberate air from the unvaporized portion of the water, means for separating the air and vapor from the uncondensed portion of the water and means for condensing the vapor by mixing the latter with the raw water to be deaerated and for passing the raw water and its condensate addition into said heater.

Signed at Philadelphia, in the county of Philadelphia and State of Pennsylvania, this eighth day of April A. D. 1921.

GEORGE HERBERT GIBSON.